(12) United States Patent
Hishinuma

(10) Patent No.: US 11,655,113 B2
(45) Date of Patent: May 23, 2023

(54) SHEET CONVEYANCE APPARATUS, IMAGE READING APPARATUS AND IMAGE FORMING APPARATUS

(71) Applicant: CANON KABUSHIKI KAISHA, Tokyo (JP)

(72) Inventor: Norikazu Hishinuma, Kashiwa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/690,039

(22) Filed: Mar. 9, 2022

(65) Prior Publication Data

US 2022/0194724 A1 Jun. 23, 2022

Related U.S. Application Data

(63) Continuation of application No. 16/442,945, filed on Jun. 17, 2019, now Pat. No. 11,292,682.

(30) Foreign Application Priority Data

Jul. 6, 2018 (JP) .............................. JP2018-129519

(51) Int. Cl.
*B65H 3/06* (2006.01)
*B65H 5/36* (2006.01)
(Continued)

(52) U.S. Cl.
CPC ................. *B65H 5/06* (2013.01); *B65H 5/36* (2013.01); *H04N 1/00602* (2013.01);
(Continued)

(58) Field of Classification Search
CPC .......... B65H 3/0684; B65H 3/06; B65H 5/36; B65H 5/38; B65H 2601/324;
(Continued)

(56) References Cited

U.S. PATENT DOCUMENTS 8,006,973 B2 * 8/2011 Toba .................... G03G 15/602
271/10.09
10,392,211 B2 8/2019 Hishinuma
(Continued)

FOREIGN PATENT DOCUMENTS

JP 2007-070107 A 3/2007
JP 2011-201656 A 10/2011
(Continued)

*Primary Examiner* — Luis A Gonzalez
(74) *Attorney, Agent, or Firm* — Venable LLP

(57) ABSTRACT

A sheet conveyance apparatus includes a cover unit having a first guide, a base unit to support the cover unit in an openable and closable manner, and having a second guide, the first guide and the second guide forming a conveyance path in a state where the cover unit is closed with respect to the base unit, and a sheet feeding unit detachable from the cover unit. In addition, a cover member is supported by the cover unit to be pivotable between a closed position and covers at least a portion of the feeding unit and an open position where the portion of the feeding unit is exposed. The cover member moves from the closed position to the open position by being pressed by the holder while the feeding unit is detached from the cover unit.

11 Claims, 22 Drawing Sheets

(51) Int. Cl.
*B65H 5/38* (2006.01)
*B65H 5/06* (2006.01)
*H04N 1/00* (2006.01)

(52) U.S. Cl.
CPC ..... *H04N 1/00615* (2013.01); *B65H 2403/51* (2013.01); *B65H 2511/212* (2013.01); *B65H 2601/324* (2013.01)

(58) Field of Classification Search
CPC .......... B65H 2601/321; B65H 2403/51; B65H 5/06; H04N 1/00602; H04N 1/00615
See application file for complete search history.

(56) References Cited

U.S. PATENT DOCUMENTS

| | | |
|---|---|---|
| 2008/0277864 A1 | 11/2008 | Liu et al. |
| 2010/0252988 A1 | 10/2010 | Hagiyama |
| 2013/0320611 A1 | 12/2013 | Kubo et al. |

FOREIGN PATENT DOCUMENTS

| | | | |
|---|---|---|---|
| JP | 2012-006756 A | | 1/2012 |
| JP | 2015-229538 A | | 12/2015 |
| JP | 2016164595 A | * | 9/2016 |

* cited by examiner

SHEET CONVEYANCE APPARATUS, IMAGE READING APPARATUS AND IMAGE FORMING APPARATUS

This application is a continuation of application Ser. No. 16/442,945, filed Jun. 17, 2019.

BACKGROUND OF THE INVENTION

Field of the Invention

The present invention relates to a sheet conveyance apparatus for conveying sheets, and an image reading apparatus and an image forming apparatus equipped with the same.

Description of the Related Art

Generally, an image forming apparatus such as a printer is known, which is connected to an upper portion of the image forming apparatus body and capable of reading images on documents. The image reading apparatus is capable of reading the image on a document conveyed by an auto document feeder (hereinafter referred to as ADF).

Hitherto, a printer capable of having a sheet feed cover of ADF opened to replace a conveyance roller unit provided on the sheet feed cover is proposed (refer to Japanese Patent Application Laid-Open Publication No. 2015-229538). A pickup roller and a sheet feed roller are rotatably supported on the conveyance roller unit, and in a state where a holding portion provided on the conveyance roller unit is held, engagement between the sheet feed cover and the conveyance roller unit is released. By drawing out the conveyance roller unit in a state where the engagement between the sheet feed cover and the conveyance roller unit is released, the conveyance roller unit can be removed from the sheet feed cover.

The conveyance roller unit disclosed in Japanese Patent Application Laid-Open Publication No. 2015-229538 is arranged in an exposed manner to the conveyance path, but if there is an area on the conveyance roller unit where the document may be caught, the area may be covered by a cover. However, if such cover is attached to the sheet feed cover, such cover must first be removed if there is a need to replace the conveyance roller unit, and the replacement workability is deteriorated thereby.

SUMMARY OF THE INVENTION

According to one aspect of the present invention, a sheet conveyance apparatus includes a cover unit including a first guide, a base unit configured to support the cover unit in an openable and closable manner, and including a second guide, the first guide and the second guide forming a conveyance path in a state where the cover unit is closed with respect to the base unit, a roller unit configured to be detachable from the cover unit, and comprising a roller configured to convey the sheet along the conveyance path and a holder configured to rotatably support the roller, the holder comprising an arm portion configured to extend in a width direction orthogonal to a sheet conveyance direction, a cam arranged on an outside of the conveyance path in the width direction and configured to abut against the arm portion, the cam being configured to swing the holder by rotating, and a cover member configured to be openable and closable with respect to the cover unit and configured to cover at least a portion of the arm portion against the conveyance path in a closed state, the cover member being opened by being pressed by the arm portion in a case where the roller unit is detached from the cover unit.

Further features of the present invention will become apparent from the following description of exemplary embodiments with reference to the attached drawings.

DESCRIPTION OF THE EMBODIMENTS

General Configuration

Figure 1:
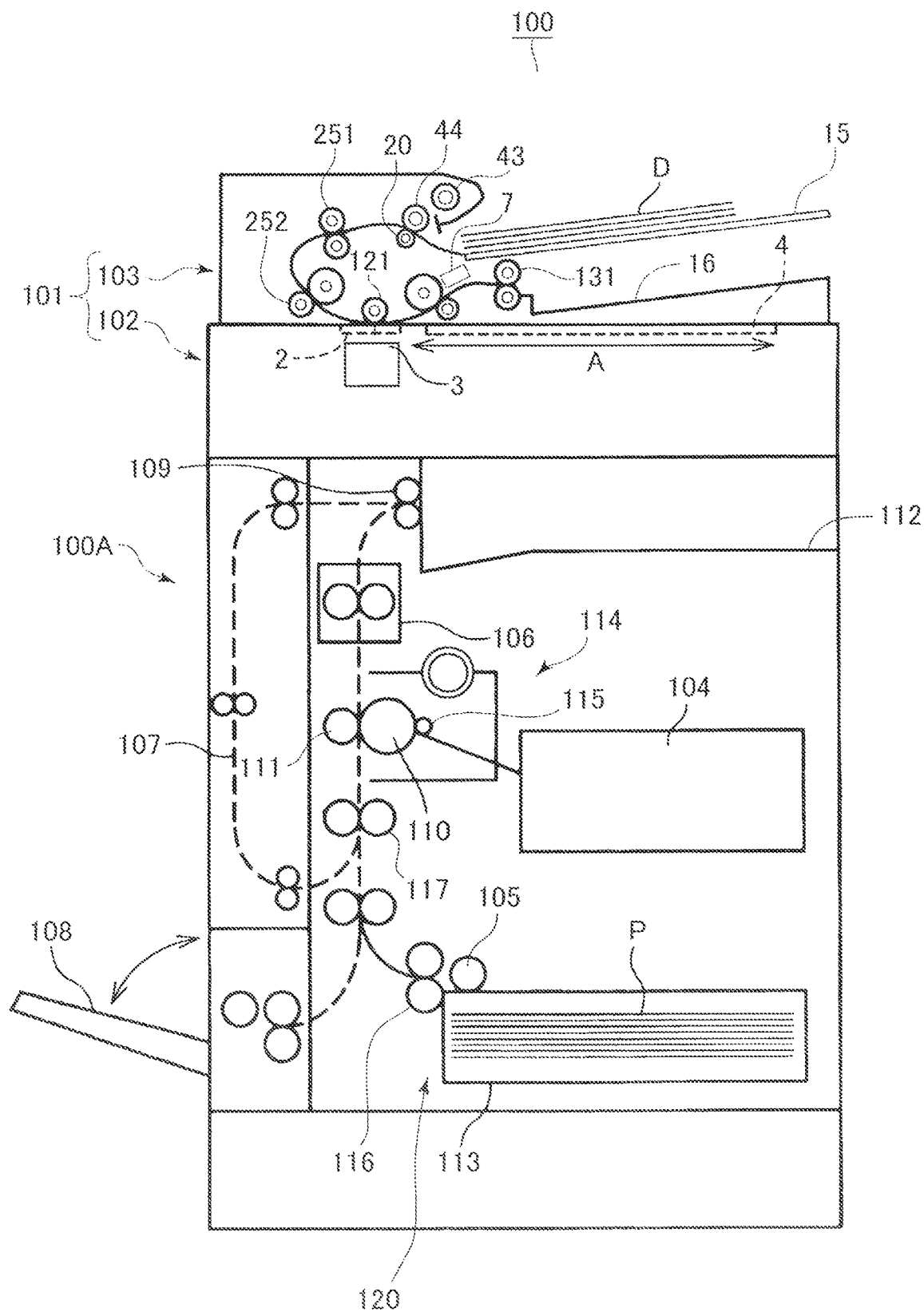
FIG. 1 is an entire schematic diagram illustrating a printer according to a present embodiment.

A printer 100 serving as an image forming apparatus is a laser beam printer adopting an electrophotographic system for forming a monochrome toner image. The printer 100 includes, as illustrated in FIG. 1, a printer main body 100A and an image reading apparatus 101 mounted on an upper portion of the printer main body 100A. The printer main body 100A includes a sheet feeding apparatus 120 for feeding stacked sheets, an image forming unit 114 for forming an image on the sheet fed by the sheet feeding apparatus 120, a fixing unit 106, and a sheet discharge roller pair 109.

If a command to form an image is output to the printer 100, an image forming process by the image forming unit 114 is started based on image information entered from an external computer connected to the printer 100, the image reading apparatus 101 and so on. The image forming unit 114 includes a photosensitive drum 110, a charge roller 115, a developing apparatus not shown, a laser scanner 104, and a transfer roller 111.

The laser scanner 104 irradiates laser beams toward the photosensitive drum 110 based on the image information being entered. In this state, the photosensitive drum 110 is charged in advance by the charge roller 115, and an electrostatic latent image is formed on the photosensitive drum 110 by having laser beams irradiated thereto. Thereafter, the electrostatic latent image is developed by a developing apparatus not shown, and a monochrome toner image is formed on the photosensitive drum 110.

Simultaneously as the image forming process described above, a sheet P is fed from the sheet feeding apparatus 120. The sheet feeding apparatus 120 includes a cassette 113 for storing sheets P, a pickup roller 105, and a separation roller pair 116. The sheet P stored in the cassette 113 is fed by the pickup roller 105 and separated one by one by the separation roller pair 116. The cassette 113 is capable of supporting the sheet in a liftable manner by a sheet supporting portion not shown, and the separation roller pair 116 may have one of the two rollers constituting the roller pair composed of a separation pad.

The sheet P separated one by one by the separation roller pair 116 is abutted against a registration roller pair 117 in a stopped state, by which skewing of the sheet P is corrected, and the registration roller pair 117 conveys the sheet P by rotating at a matched timing with the transfer of toner image. The toner image on the photosensitive drum 110 is transferred to the sheet P conveyed by the registration roller pair 117 through electrostatic load bias applied to the transfer roller 111.

Predetermined heat and pressure is applied by the fixing unit 106 to the sheet P to which the toner image has been transferred, by which toner is melted and fixed. The sheet P having passed through the fixing unit 106 is discharged by the sheet discharge roller pair 109 onto a sheet discharge tray 112. The sheet can be fed not only from the cassette 113 but also from a multi-tray 108. The multi-tray 108 is supported in an openable and closable manner with respect to the printer main body 100A, and it is designed to support the sheet in an opened state.

If images are to be formed on both sides of the sheet P, the sheet P on which an image has been formed on a first side, i.e., front side, is subjected to switch-back by the sheet discharge roller pair 109 and sent into the duplex conveyance path 107. The sheet P sent into the duplex conveyance path 107 is conveyed again to the registration roller pair 117, and an image is formed on a second side, i.e., rear side, by the photosensitive drum 110 and the transfer roller 111. The sheet P passes through the fixing unit 106 and is discharged by the sheet discharge roller pair 109 onto the sheet discharge tray 112.

Image Reading Apparatus

Figure 2:
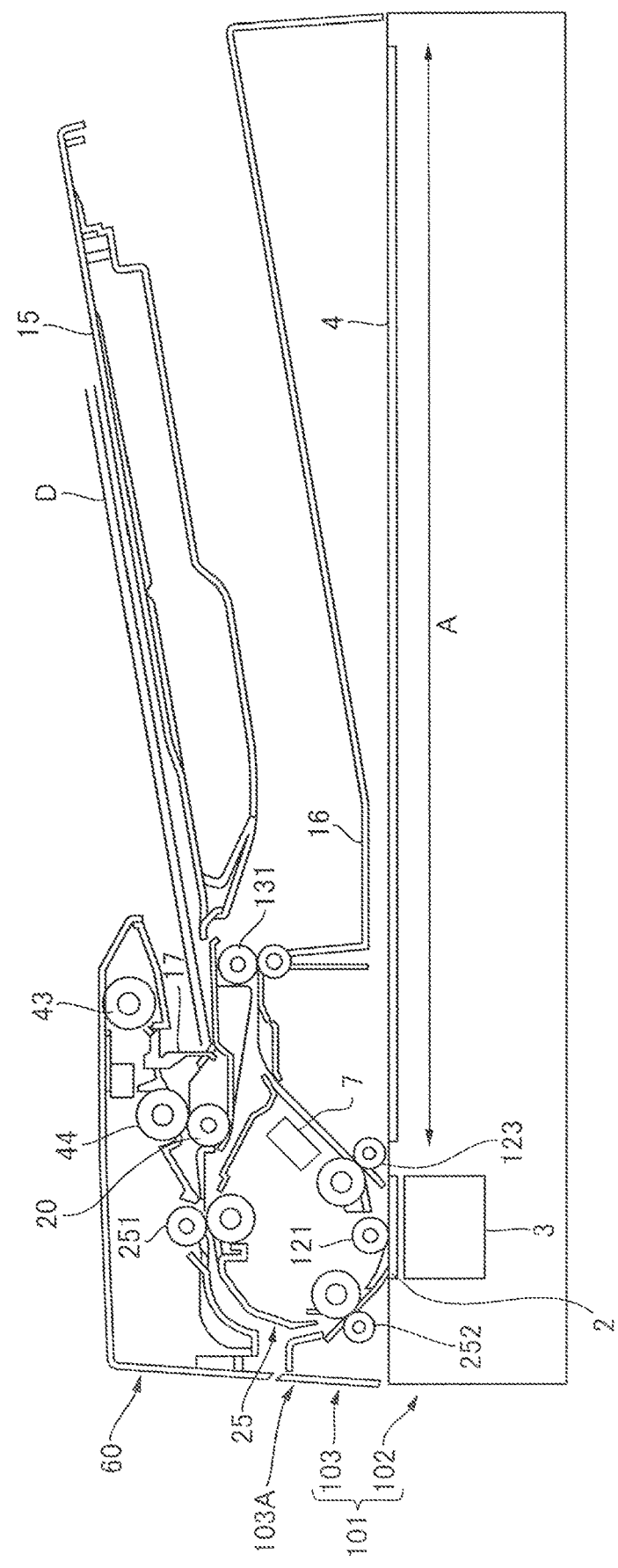
FIG. 2 is a cross-sectional view illustrating an image reading apparatus.

Next, the image reading apparatus 101 will be described in detail. The image reading apparatus 101 includes, as illustrated in FIG. 2, an auto document feeder, hereinafter referred to as ADF, 103 that conveys a document D supported on a document tray 15 and discharges the document onto a document discharge tray 16. Further, the image reading apparatus 101 includes a reading unit 102 that reads the document D conveyed by the ADF 103. The ADF 103 serving as a sheet conveyance apparatus is supported pivotably by a hinge not shown to a front side and a depth side of FIG. 2 with respect to the reading unit 102 such that a platen document glass 4 can be exposed. In the present embodiment, a sheet includes both a recording material on which an image is formed by the image forming unit 114 and a document having an image thereon read by the image reading apparatus 101. The document can be blank paper or can have an image formed on one side or both sides thereof.

The ADF 103 includes a shutter member 17, a pickup roller 43 serving as a roller, a feed roller 44, a separation roller 20, and a plurality of conveyance roller pairs 251, 252 and 123. The ADF 103 includes a platen roller 121 arranged opposed to a platen glass 2, and a second reading portion 7.

The reading unit 102 includes the platen glass 2, the platen document glass 4 capable of supporting the document D and a first reading portion 3, and the first reading portion 3 is configured movable in a sub-scanning direction, that is, in the direction of arrow A. The first reading portion 3 and the second reading portion 7 include a light source not shown, a photoelectric conversion element and the like, wherein a CCD sensor, a CMOS sensor and the like can be adopted as the photoelectric conversion element. The light emitted from the light source is reflected by the document D and reflected light from the document D will be incident on the photoelectric conversion element. The photoelectric conversion element performs photoelectric conversion of reflected light from the document D, by which image on the document D can be obtained as image information.

The platen glass 2 is formed of a transparent member such as glass that transmits light. A configuration of reading the document conveyed by the ADF 103 is called document feeding-reading, and a configuration of reading the document positioned on the platen document glass 4 by the first reading portion 3 while moving the first reading portion 3 in the sub-scanning direction is called document fixed reading.

In the case of document fixed reading, the user opens the ADF 103 and places the document on the platen document glass 4. Then, the user operates an operation panel not shown to start document fixed reading by the image reading apparatus 101. When document fixed reading is started, the first reading portion 3 moves in the sub-scanning direction while reading the image on the document placed on the platen document glass 4.

In the case of document feeding-reading, the user places the document D on the document tray 15 while abutting a leading edge of the document D against the shutter member 17, and the user operates the operation panel to start document feeding-reading by the image reading apparatus 101. In this state, the first reading portion 3 reads the image while stopping at a position below the platen glass 2. In a state where the document feeding-reading is started, the shutter member 17 retreats upward, and the document D placed on the document tray 15 is conveyed by the pickup roller 43 and separated one by one by the feed roller 44 and the separation roller 20. The document D is conveyed along a document conveyance path 25 serving as the conveyance path by the conveyance roller pairs 251, 252 and 123, and is pressed against the platen glass 2 by the platen roller 121.

The image on a first side, i.e., front side, of the document D is read by the first reading portion 3 through the platen glass 2 while the document D is being guided by the platen roller 121. If images on both sides of the document D are to be read, after the image on the document D has been read by the first reading portion 3, the image on the second side, i.e., rear side, of the document D is read by the second reading portion 7. A platen glass and the like are provided to face the second reading portion 7, but the description thereof is omitted. Then, the document D is discharged to the exterior of the apparatus by a sheet discharge roller pair 131 and supported on the document discharge tray 16.

Figure 3:
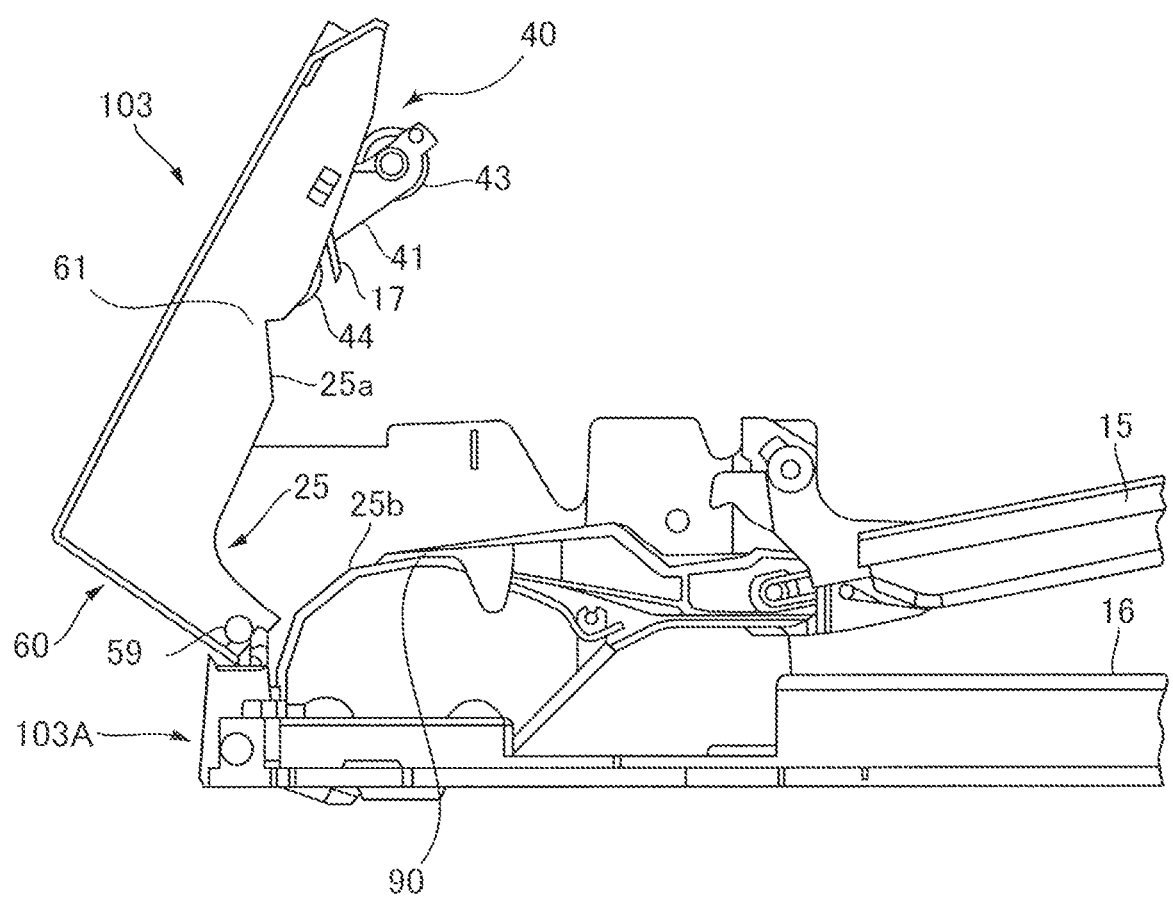
FIG. 3 is a side view illustrating the image reading apparatus in a state where a cover unit is opened.

The ADF 103 includes, as illustrated in FIG. 3, an ADF main body 103A serving as a base unit, and a cover unit 60 serving as an apparatus body that is supported to open and close about a fulcrum 59 with respect to the ADF main body 103A. The cover unit 60 includes an upper guide member 61 including a first guide 25a, and a sheet feed unit 40 serving as a roller unit supported detachably on the upper guide member 61. The ADF main body 103A includes a lower guide member 90 including a second guide 25b forming a portion of the document conveyance path 25 together with the first guide 25a. The cover unit 60 is opened for treating jammed sheets caught in the document conveyance path 25 or for replacing the sheet feed unit 40.

Figure 4:
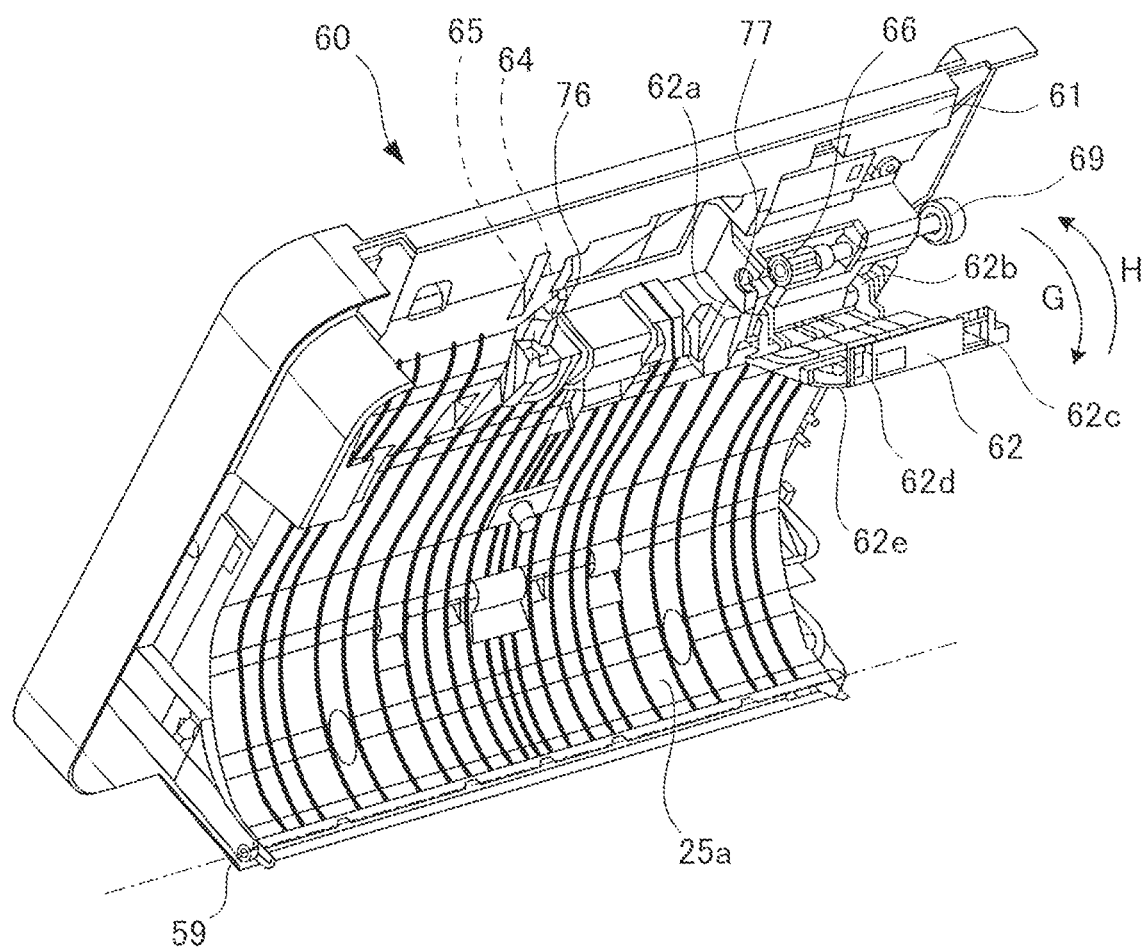
FIG. 4 is a perspective view illustrating the cover unit.

As illustrated in FIG. 4, the sheet feed unit 40 is, as described later, positioned by bearing portions 65 and 77 formed on the upper guide member 61, and retained by a coupling 66, a shaft clamping portion 64 and a separation arm retaining portion 76. A cover member 62 is supported on the upper guide member 61 to open and close around opening and closing shafts 62a and 62b, and the cover member 62 covers the coupling 66 and the like that transmits drive to the sheet feed unit 40. In other words, the cover member 62 is supported pivotably with respect to the upper guide member 61 around an axis extending in a width direction. Further, the cover member 62 includes a guide surface 62e that guides sheets, and the guide surface 62e forms the document conveyance path 25 that guides the document D together with the first guide 25a and the second guide 25b (refer to FIG. 3).

Sheet Feed Unit

Figure 5:
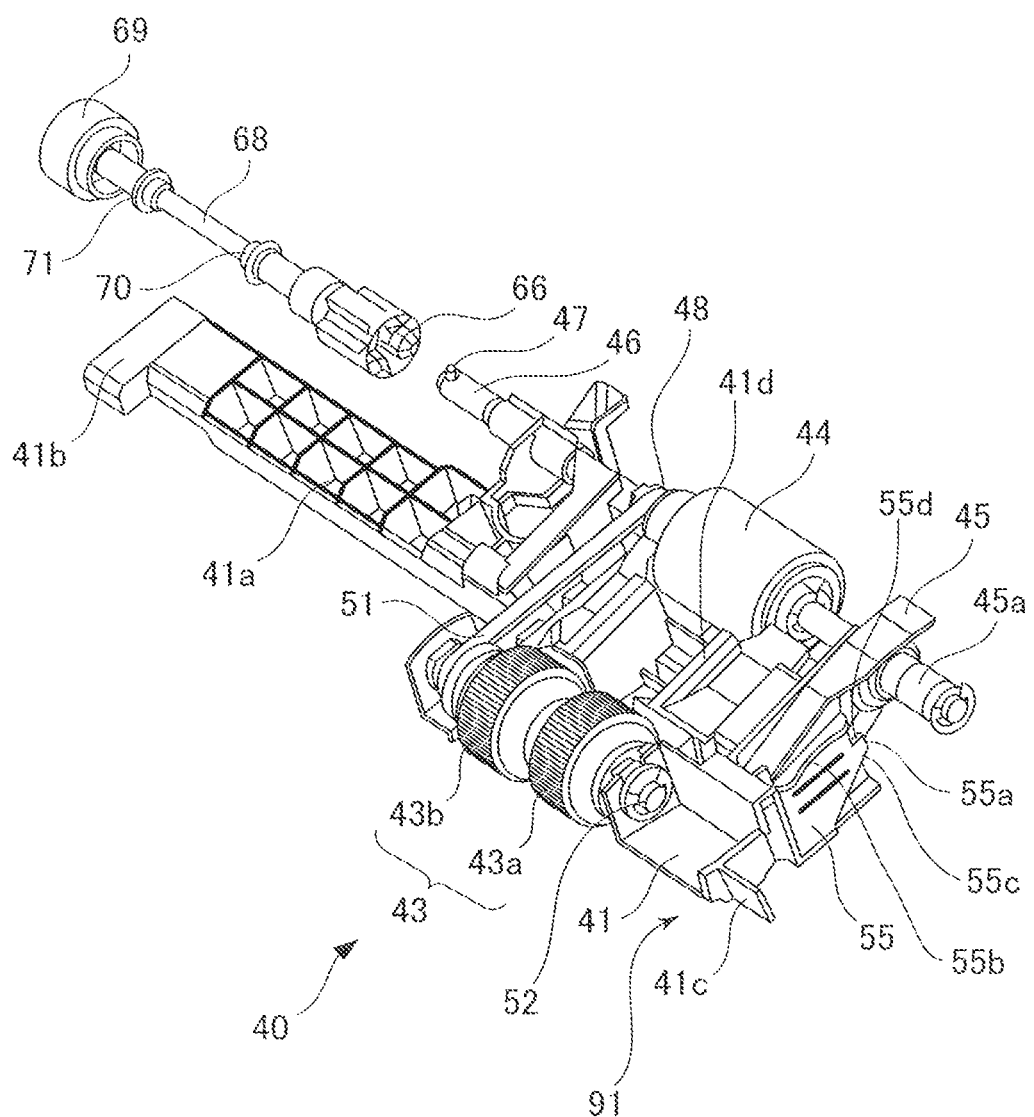
FIG. 5 is a perspective view illustrating a sheet feed unit.
Figure 6:
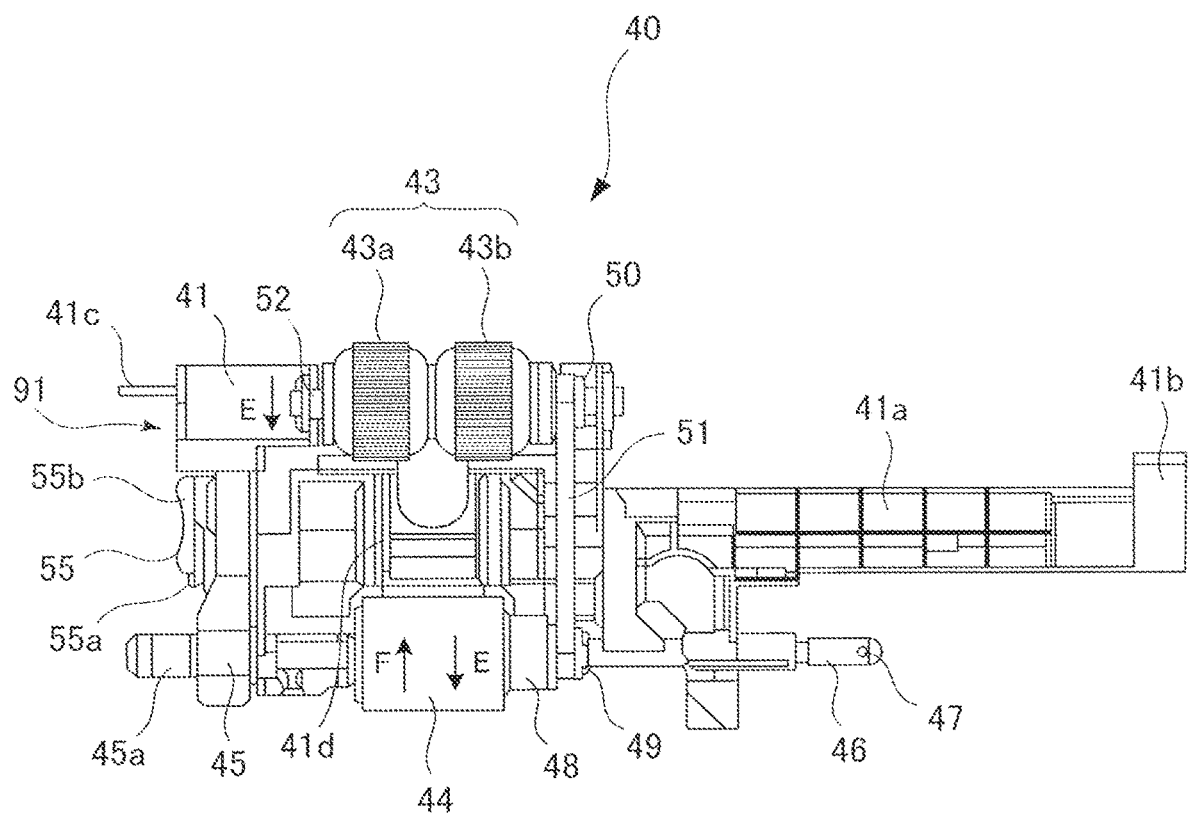
FIG. 6 is a front view illustrating the sheet feed unit.

The sheet feed unit 40 includes, as illustrated in FIGS. 5 and 6, a feed roller shaft 46 serving as a rotation shaft, a feed roller 44 supported rotatably on the feed roller shaft 46, a holder member 45, and a swing arm 41. The feed roller 44 is attached to the feed roller shaft 46 via a one-way clutch 48, and by driving the feed roller shaft 46, the one-way clutch 48 can rotate in a sheet conveyance direction, that is, in a direction of arrow E of FIG. 6. Meanwhile, in a state where the feed roller shaft 46 is stopped, the feed roller 44 can rotate in the direction of arrow E of FIG. 6 by co-rotating with the document D conveyed by the conveyance roller pair 251 (refer to FIG. 2), but is prevented from rotating in the direction of arrow F.

The holder member 45 covers a first end of the feed roller shaft 46 by a cover portion 45a and is supported swingably on the feed roller shaft 46. A swing arm 41 is swingably supported on the feed roller shaft 46 and fixed to the holder member 45. A separation arm 55 described later is attached to the holder member 45, and the holder member 45, the swing arm 41 and the separation arm 55 constitute a holder unit 91 serving as a holder.

The swing arm 41 rotatably supports a pickup shaft 52 that extends in parallel with the feed roller shaft 46, and [on] the pickup shaft 52 is rotatably supported the pickup roller 43. The pickup roller 43 is composed of two rollers 43a and 43b, and on an end portion of the pickup shaft 52 on a roller 43b side is provided a driven pulley 50 via a one-way clutch. A transmission belt 51 is wound around the driven pulley 50 and a drive pulley 49 provided on the feed roller shaft 46, and the transmission belt 51 rotates by the rotation of the feed roller shaft 46.

The pickup roller 43 conveys the sheet by the transmission belt 51 rotating while being in contact with the sheet. Meanwhile, in a state where the feed roller shaft 46 and the transmission belt 51 are stopped, the pickup roller 43 is capable of rotating in the direction of arrow E of FIG. 6 by being co-rotated with the document D conveyed by the conveyance roller pair 251 (refer to FIG. 2).

Further, the swing arm 41 is connected to a coil spring not shown that is loosely fit to the feed roller shaft 46, and the coil spring functions as a spring clutch. That is, in a state where the feed roller shaft 46 is rotating in a direction of normal rotation, that is, sheet conveyance direction, the coil spring tightens, by which the feed roller shaft 46 together with the swing arm 41 rotates downward. In a state where a reading job is completed and drive supplied to the feed roller shaft 46 is stopped, the force to rotate the swing arm 41 downward is lost, and the swing arm 41 is lifted to a standby position by a return spring not shown.

The swing arm 41 includes an arm portion 41a that extends in a width direction orthogonal to the sheet conveyance direction of the pickup roller 43 and that has a cam follower 41b formed on a leading end thereof, and a flag portion 41c for detecting the standby position of the swing arm 41. The cam follower 41b abuts against a lifting cam 85 described later, and the holder unit 91 is lifted along the cam surface of the lifting cam 85. Further, the swing arm 41 includes a tongue rib 41d that the user holds together with a pressing portion 55b of the separation arm 55. The separation arm 55 serving as the holding portion also includes a projection 55a in addition to the pressing portion 55b.

Lifting Unit

Next, we will describe a lifting unit 95 for lifting, or swinging, the swing arm 41. The lifting unit 95 is provided on the ADF main body 103A (refer to FIG. 3), and in a state where the cover unit 60 is closed, the lifting unit 95 is arranged adjacent to a driven gear 69 (refer to FIG. 4) that enters drive to the coupling 66.

Figure 7:
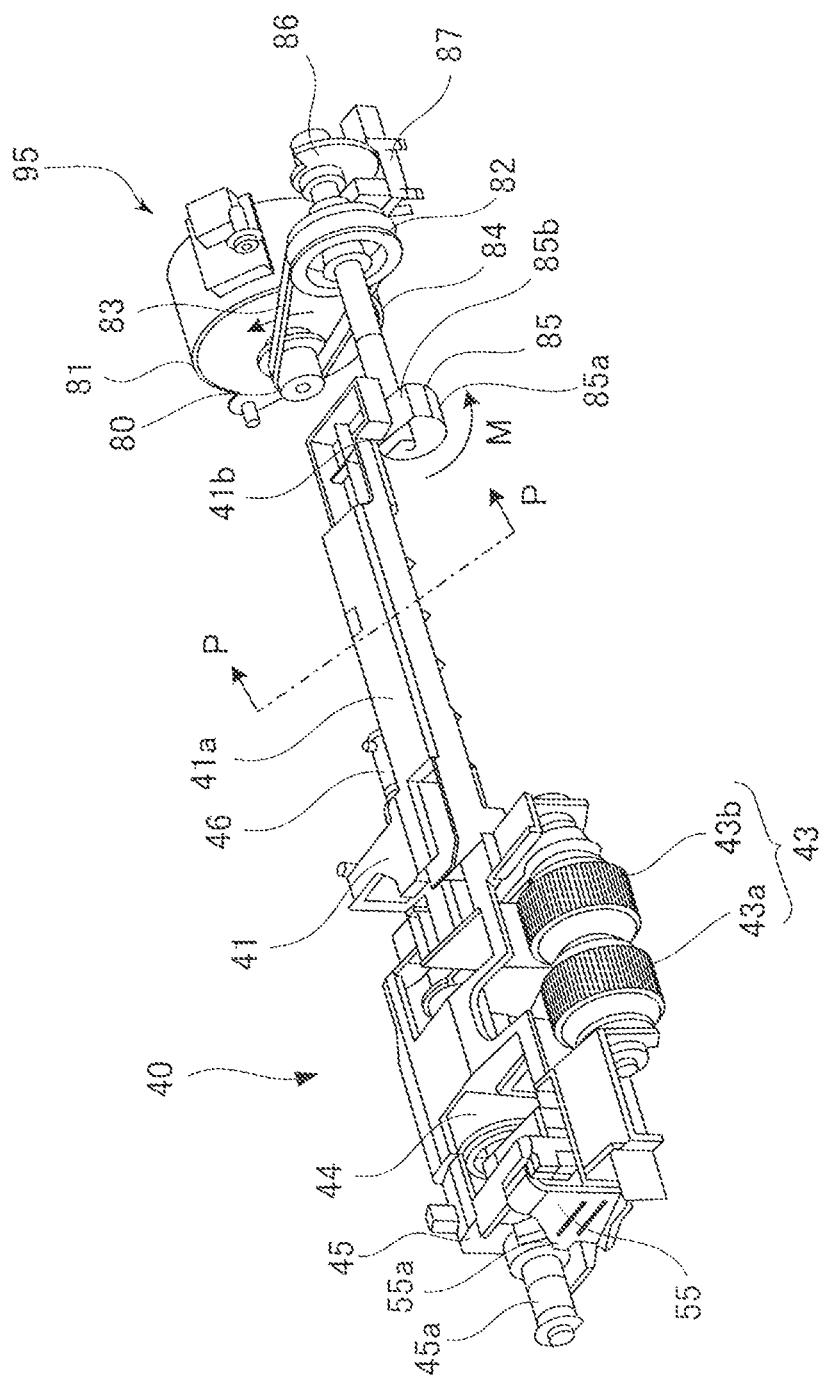
FIG. 7 is a perspective view illustrating the sheet feed unit and a lifting unit.
Figure 8:
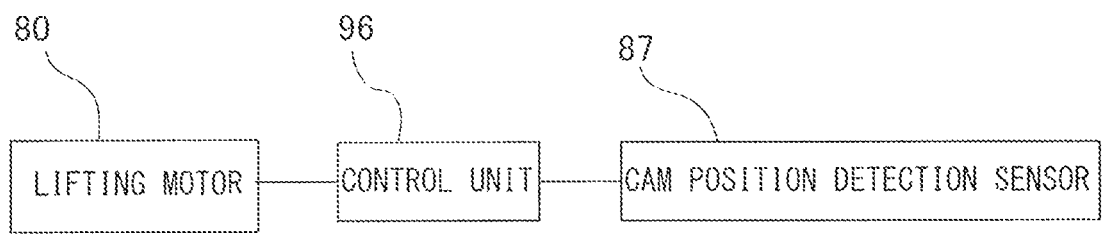
FIG. 8 is a control block diagram according to the present embodiment.

The lifting unit 95 includes, as illustrated in FIGS. 7 and 8, a lifting motor 80, a motor pulley 81, a driven pulley 82, a transmission belt 83, a cam shaft 84, the lifting cam 85, a cam position detecting flag 86, and a cam position detecting sensor 87. The cam position detecting sensor 87 and the lifting motor 80 are connected to a control unit 96, and the control unit 96 controls the lifting motor 80 based on a detection result of the cam position detecting sensor 87. The control unit 96 may be provided on either the printer main body 100A or the image reading apparatus 101. The motor pulley 81 is attached to a motor shaft of the lifting motor 80, and the transmission belt 83 is wound around the motor pulley 81 and the driven pulley 82.

The driven pulley 82 is fixed to the cam shaft 84, wherein on the first end of the cam shaft 84 is attached the cam position detecting flag 86 serving as a flag portion that rotates integrally with the cam shaft 84, and on a second end of the cam shaft 84 is fixed the lifting cam 85. The lifting cam 85 rotates in a direction of arrow M along with the rotation of the cam shaft 84. The cam position detecting flag 86 is formed in a disk shape with a portion cut out, and it is capable of blocking or opening an optical path between a light emitting component and a photosensing portion of the cam position detecting sensor 87. The cam position detecting sensor 87 serving as a sensor outputs detection signals according to the position of the cam position detecting flag 86. The phase of the lifting cam 85 can be detected by the cam position detecting sensor 87 and the cam position detecting flag 86 configured in this manner.

The lifting cam 85 serving as a cam is formed in an approximately crescentic shape and includes a cam surface 85a formed of an arc-shaped surface and a smooth surface 85b. The lifting cam 85 is constantly abutted against the cam follower 41b of the swing arm 41, and the swing arm 41 swings according to the rotational phase of the lifting cam 85. That is, if a reading job to read the document D placed on the document tray 15 is entered, the feed roller shaft 46 rotates, the swing arm 41 swings, and the pickup roller 43 abuts against an upper surface of the document D. The document D is fed by having the pickup roller 43 rotate in this state.

In this state, the lifting motor 80 controls the phase of the lifting cam 85 based on the detection result of the cam position detecting sensor 87, and while the document D is fed by the pickup roller 43, the smooth surface 85b of the lifting cam 85 is abutted against the cam follower 41b. Meanwhile, while the document D is not fed by the pickup roller 43, the cam surface 85a of the lifting cam 85 abuts against the cam follower 41b. Thereby, the swing arm 41 is lifted slightly, and the pickup roller 43 is separated from the document D.

Recently, it is attempted to improve productivity by increasing the sheet conveyance speed or narrowing interval between sheets, or distance between a preceding sheet and a subsequent sheet. Further, there are demands for the printer to convey various types of sheets including thin paper and thick paper. In a printer having improved productivity and capable of conveying various types of sheets, the pickup roller 43 and the document D must be abutted against and separated from each other highly accurately so as not to cause conveyance failure of document. According to the configuration of the present embodiment, the swing arm 41 is lifted by the lifting cam 85, according to which the pickup roller 43 is abutted against or separated from the document D with high accuracy.

Figure 9:
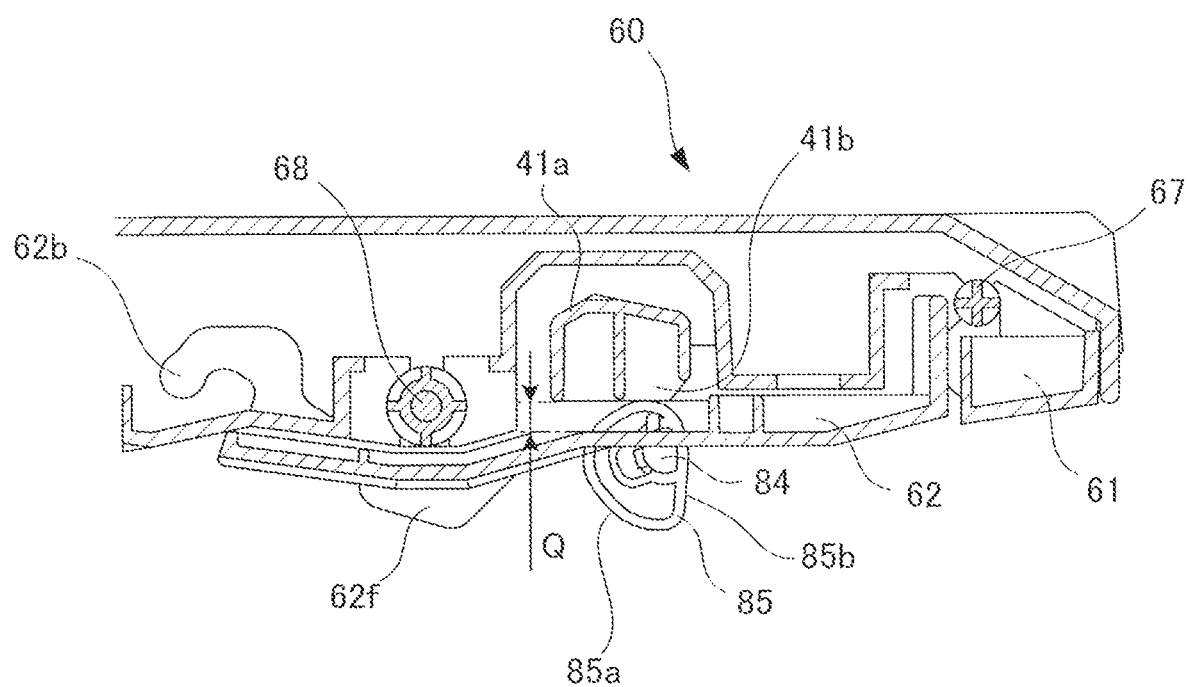
FIG. 9 is a cross-sectional view taken in arrow P-P direction of FIG. 7 illustrating a cover member in a state where a cam surface and a cam follower are abutted.
Figure 10:
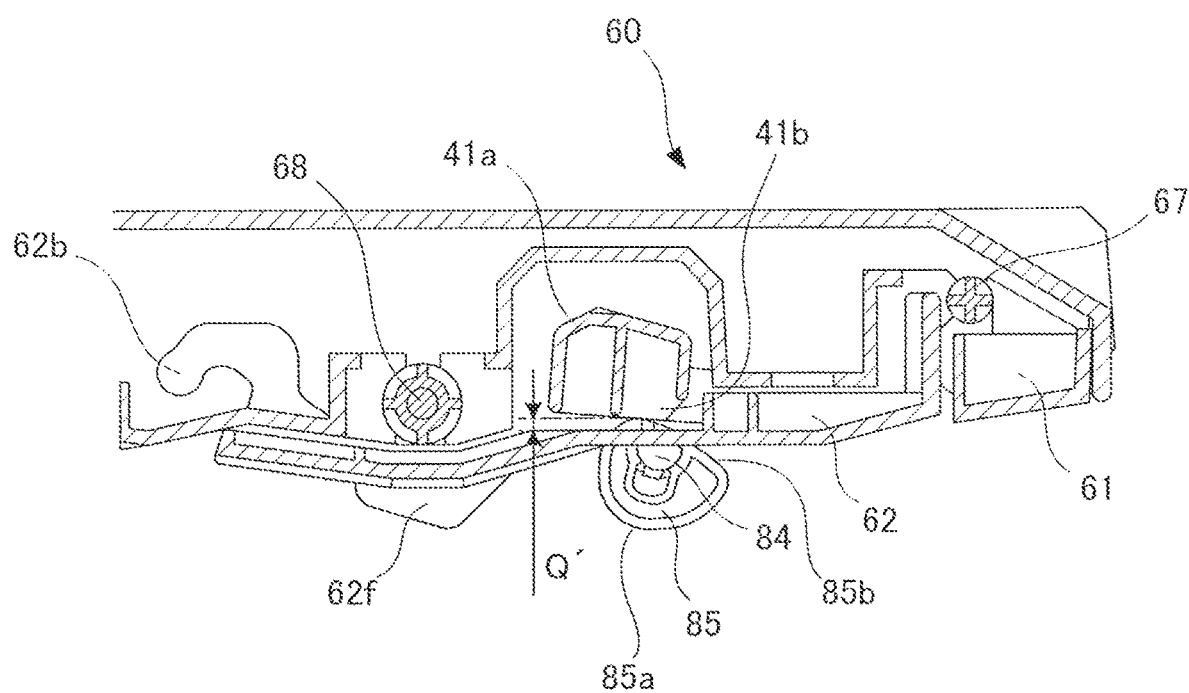
FIG. 10 is a cross-sectional view taken in arrow P-P direction of FIG. 7 illustrating a cover member in a state where a smooth surface and the cam follower are abutted.

FIG. 9 is a cross-sectional view taken in direction of arrow P-P of FIG. 7 illustrating the cover member 62 in a state where the cam surface 85a is abutted against the cam follower 41b, that is, in a state where the document D and the pickup roller 43 are separated. In this state, the cover member 62 and the arm portion 41a are separated by gap Q. FIG. 10 is a cross-sectional view taken in direction of arrow P-P of FIG. 7 illustrating the cover member 62 in a state where the smooth surface 85b is abutted against the cam follower 41b, that is, in a state where the document D is abutted against the pickup roller 43. In this state, the cover member 62 and the arm portion 41a are separated by gap Q' (0<Q'<Q). As described, regardless of the phase of the lifting cam 85, the arm portion 41a of the swing arm 41 and the cover member 62 are in a non-contact positional relationship.

Support Configuration of Sheet Feed Unit

Figure 11:
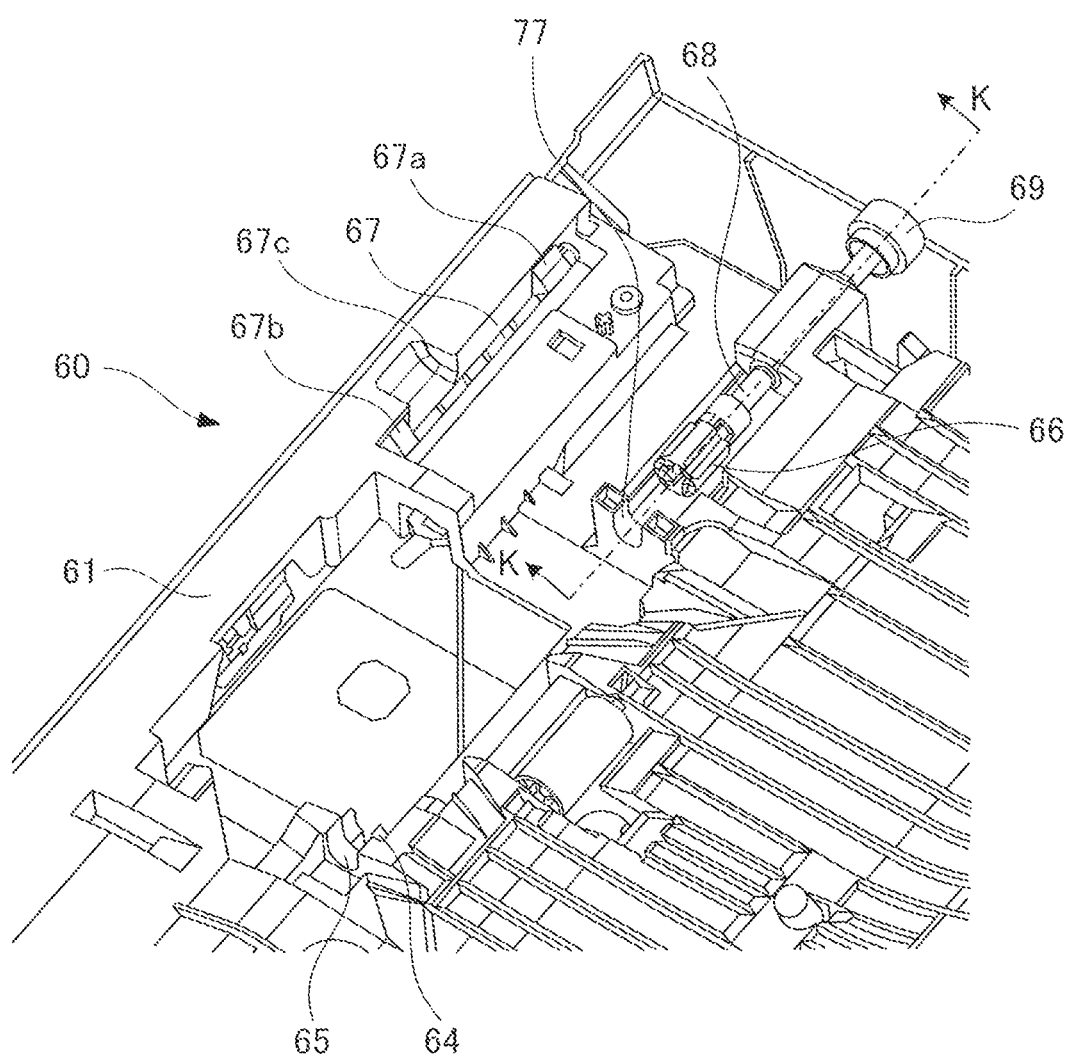
FIG. 11 is a perspective view illustrating a coupling and a retaining lever.

Next, a support configuration of the sheet feed unit 40 will be described. As illustrated in FIG. 11, the feed roller shaft 46 of the sheet feed unit 40 has its first end side positioned by a bearing portion 77 of the upper guide member 61 and connected to the coupling 66. The coupling 66 is capable of being connected to and separated from the feed roller shaft 46. As illustrated in FIG. 5, a spring pin 47 is provided on a first end of the feed roller shaft 46, and in a state where the spring pin 47 and the coupling 66 are engaged, the rotation of the coupling 66 is transmitted to the feed roller shaft 46.

In this configuration, a retaining lever 67 is arranged upstream in the sheet conveyance direction of the coupling 66, and the retaining lever 67 is supported pivotably on the upper guide member 61. Lever claws 67a and 67b are provided on the retaining lever 67, and in a state where the lever claws 67a and 67b are engaged with engagement hole portions 62c and 62d formed on the cover member 62 (refer to FIG. 4), the cover member 62 is maintained in a closed state. The retaining lever 67 is urged by a spring not shown so that the lever claws 67a and 67b are engaged with the engagement hole portions 62c and 62d. A recess portion 67c is formed in the vicinity of the retaining lever 67 on the upper guide member 61, and the user can open the cover member 62 in a closed state by inserting a finger to the recess portion 67c.

Figure 12:
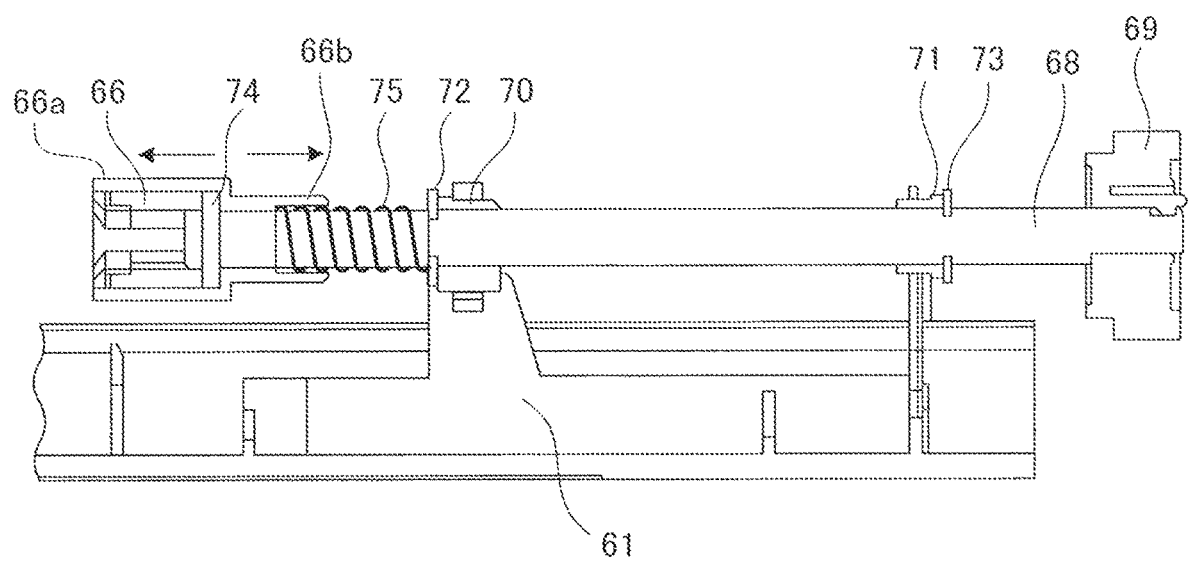
FIG. 12 is a cross-sectional view taken in arrow K-K direction of FIG. 11 illustrating a peripheral configuration of the coupling.

The coupling 66 is provided on a drive shaft 68, as illustrated in FIG. 11, and on an end portion of the drive shaft 68 opposite to the coupling 66 is fixed the driven gear 69 to which rotation from a drive gear not shown is transmitted. FIG. 12 is a cross-sectional view taken from arrow K-K direction of FIG. 11. The drive shaft 68 is supported rotatably on the upper guide member 61 by bearings 70 and 71, as illustrated in FIG. 12, and regulated from moving in the axial direction by E rings 72 and 73.

The coupling 66 includes a first cylindrical portion 66a storing a parallel pin 74 provided at an end portion of the drive shaft 68, and a second cylindrical portion 66b having a smaller radius than the first cylindrical portion 66a and capable of sliding on the drive shaft 68. A compression spring 75 is arranged between the second cylindrical portion 66b and the E ring 72, and the parallel pin 74 is pressed against a stepped portion between the first cylindrical portion 66a and the second cylindrical portion 66b in a natural state by urging force of the compression spring 75. The coupling 66 is capable of sliding toward the driven gear 69 along the axial direction against urging force of the compression spring 75, and when the sheet feed unit 40 is being attached or detached, the coupling 66 is moved in sliding motion by the user.

Figure 13:
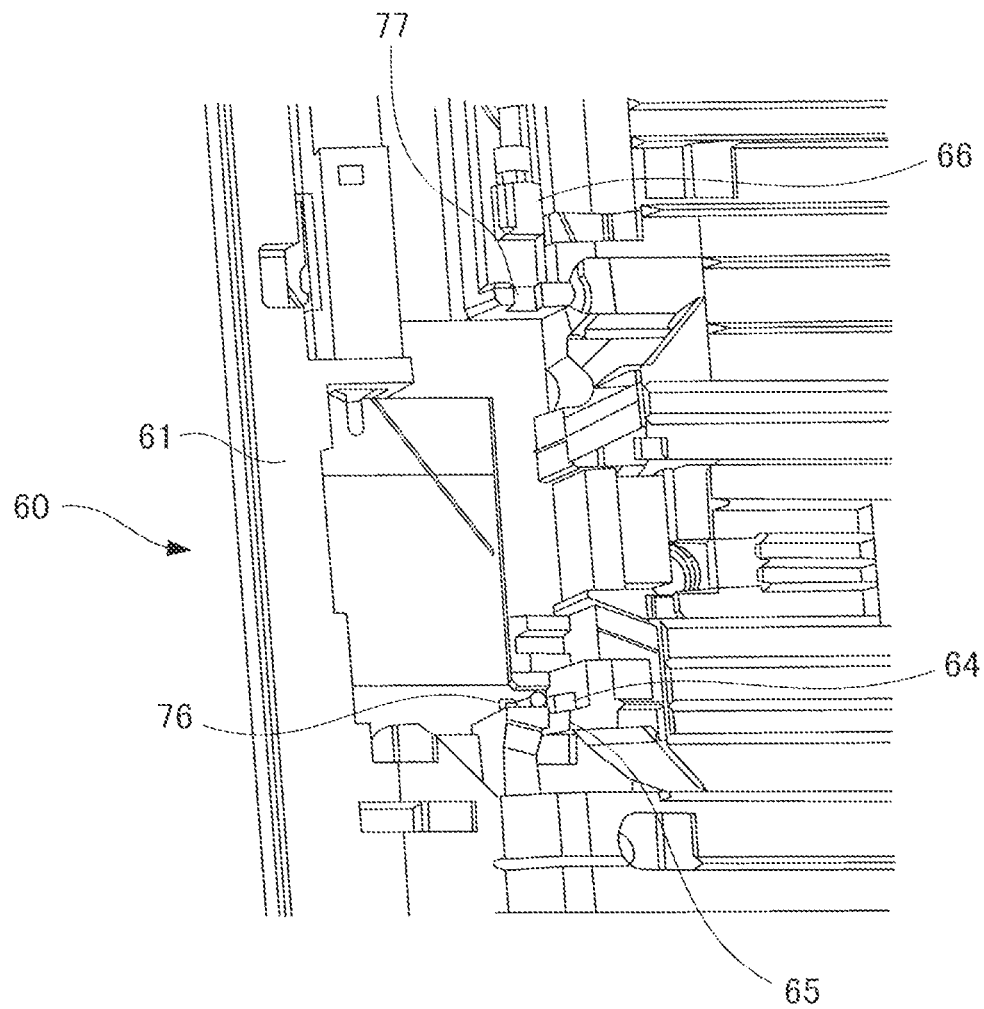
FIG. 13 is a perspective view illustrating a bearing portion and a shaft clamping portion of an upper guide member.
Figure 14:
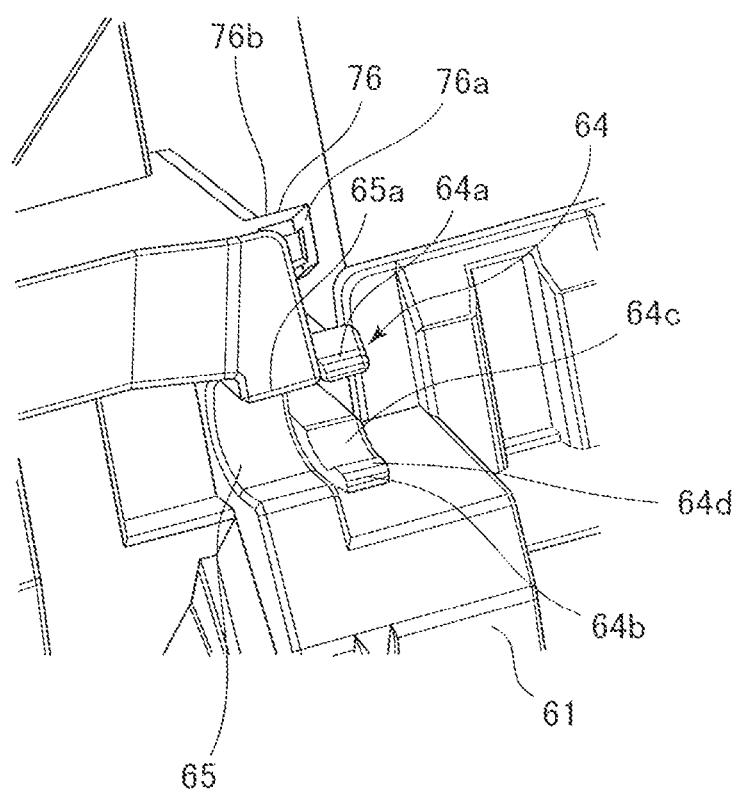
FIG. 14 is a perspective view illustrating the bearing portion, the shaft clamping portion and a separation arm retaining portion.
Figure 16:
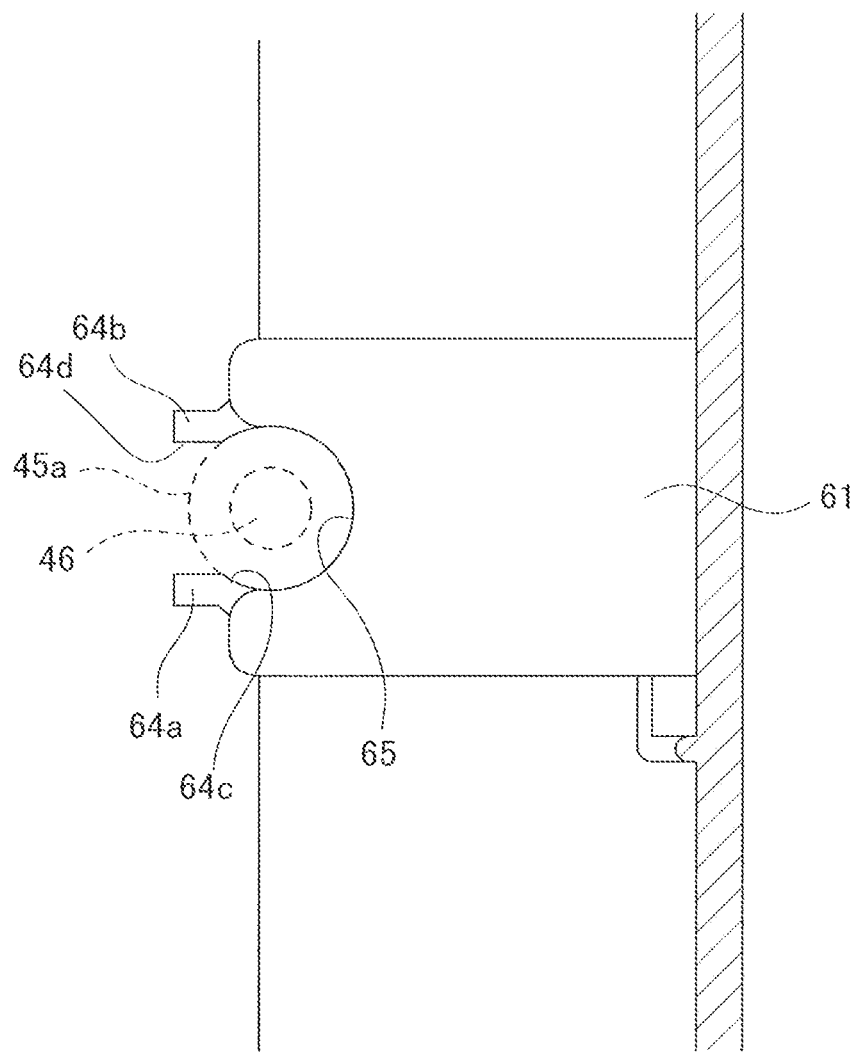
FIG. 16 is a cross-sectional view taken in arrow W-W direction of FIG. 15 illustrating the bearing portion and the shaft clamping portion.

As illustrated in FIGS. 13 and 14, a second end side of the feed roller shaft 46 of the sheet feed unit 40 is positioned by an arc-shaped bearing portion 65 provided on the upper guide member 61. Further, the shaft clamping portion 64 is arranged adjacent to the bearing portion 65 on the upper guide member 61, and a pair of shaft nipping pieces 64a and 64b are provided on the shaft clamping portion 64. A nipping surface 64c capable of nipping the cover portion 45a of the holder member 45 that covers the first end of the feed roller shaft 46 is formed on the respective shaft nipping pieces 64a and 64b. The nipping surface 64c and the bearing portion 65 are formed in an arc shape along the outer circumference of the cover portion 45a, as illustrated in FIG. 16. As described, a downstream side in the detaching direction in which the sheet feed unit 40 is detached from the cover unit 60 of the shaft clamping portion 64 serving as the retaining portion is formed to be opened. That is, the shaft clamping portion 64 has an opening portion 64d whose downstream side in the detaching direction is opened.

The shaft nipping pieces 64a and 64b are capable of elastically deforming in directions moving away from each other by the cover portion 45a being pushed in, and the cover portion 45a is nipped by the nipping surface 64c of the respective shaft nipping pieces 64a and 64b. That is, the sheet feed unit 40 is positioned by the bearing portion 65 through the cover portion 45a of the feed roller shaft 46 and the holder member 45, and capable of being retained by the shaft clamping portion 64.

Figure 15:
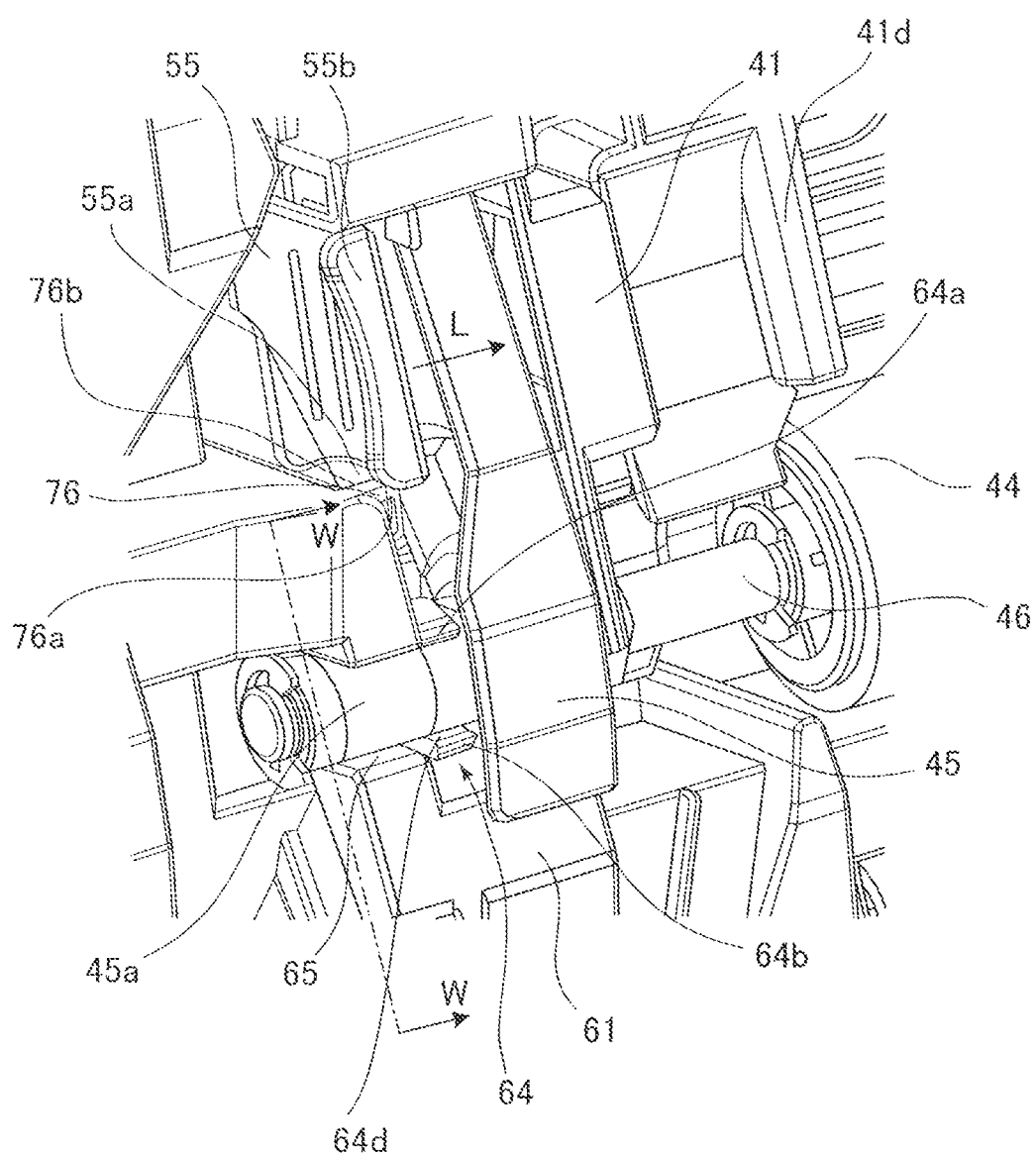
FIG. 15 is an enlarged perspective view illustrating the bearing portion, the shaft clamping portion and the separation arm retaining portion.

As illustrated in FIGS. 14 and 15, the separation arm retaining portion 76 serving as an engaged portion is formed in the vicinity of the shaft clamping portion 64 on the upper guide member 61. The separation arm retaining portion 76 is capable of being engaged with the projection 55a serving as the engagement portion of the separation arm 55 provided on the sheet feed unit 40. In further detail, as illustrated in FIG. 14, the separation arm retaining portion 76 includes an inclined surface 76a and an engagement surface 76b. Further, the projection 55a includes, as illustrated in FIG. 5, an inclined surface 55c and an engagement surface 55d.

In a state where the sheet feed unit 40 is mounted on the cover unit 60, the separation arm retaining portion 76 is elastically deformed while the inclined surface 76a of the separation arm retaining portion 76 slides against the inclined surface 55c of the projection 55a. Then, if the inclined surface 55c of the projection 55a exceeds the inclined surface 76a of the separation arm retaining portion 76, deformation of the separation arm retaining portion 76 is returned, and the engagement surface 55d of the projection 55a engages with the engagement surface 76b of the separation arm retaining portion 76. The projection 55a of the separation arm 55 is configured movable between a first position where the projection 55a is engageable with the separation arm retaining portion 76 and a second position where engagement with the separation arm retaining portion 76 is released. As illustrated in FIG. 15, in a state where the user holds the tongue rib 41d and the pressing portion 55b, the projection 55a is deformed elastically in the direction of arrow L from the first position to the second position, and engagement with the separation arm retaining portion 76 can be released. It is also possible to hold the tongue rib 41d and the pressing portion 55b while mounting the sheet feed unit 40 to elastically deform the projection 55a.

Attaching and Detaching Operation of Sheet Feed Unit

Figure 17:
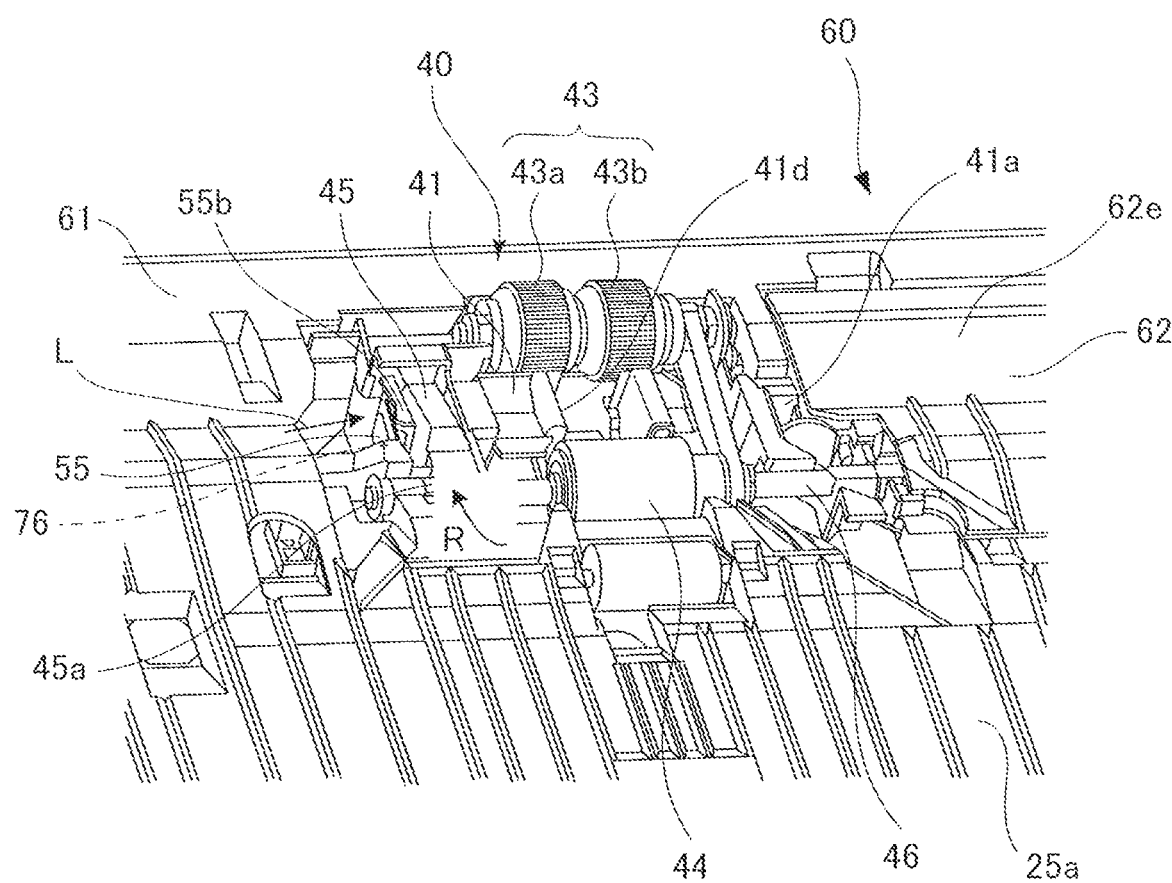
FIG. 17 is a perspective view illustrating a state in which the sheet feed unit is attached to the cover unit.

Next, attaching and detaching operation of the sheet feed unit 40 will be described. First, a detaching operation of the sheet feed unit 40 will be described. In removing the sheet feed unit 40, the user opens the cover unit 60 from the ADF main body 103A, as illustrated in FIG. 3. At this time, as illustrated in FIG. 17, in a state where the sheet feed unit 40 is mounted to the cover unit 60, the separation arm 55 is engaged to the separation arm retaining portion 76. Further, the cover member 62 is in a closed state with respect to the upper guide member 61.

Figure 18:
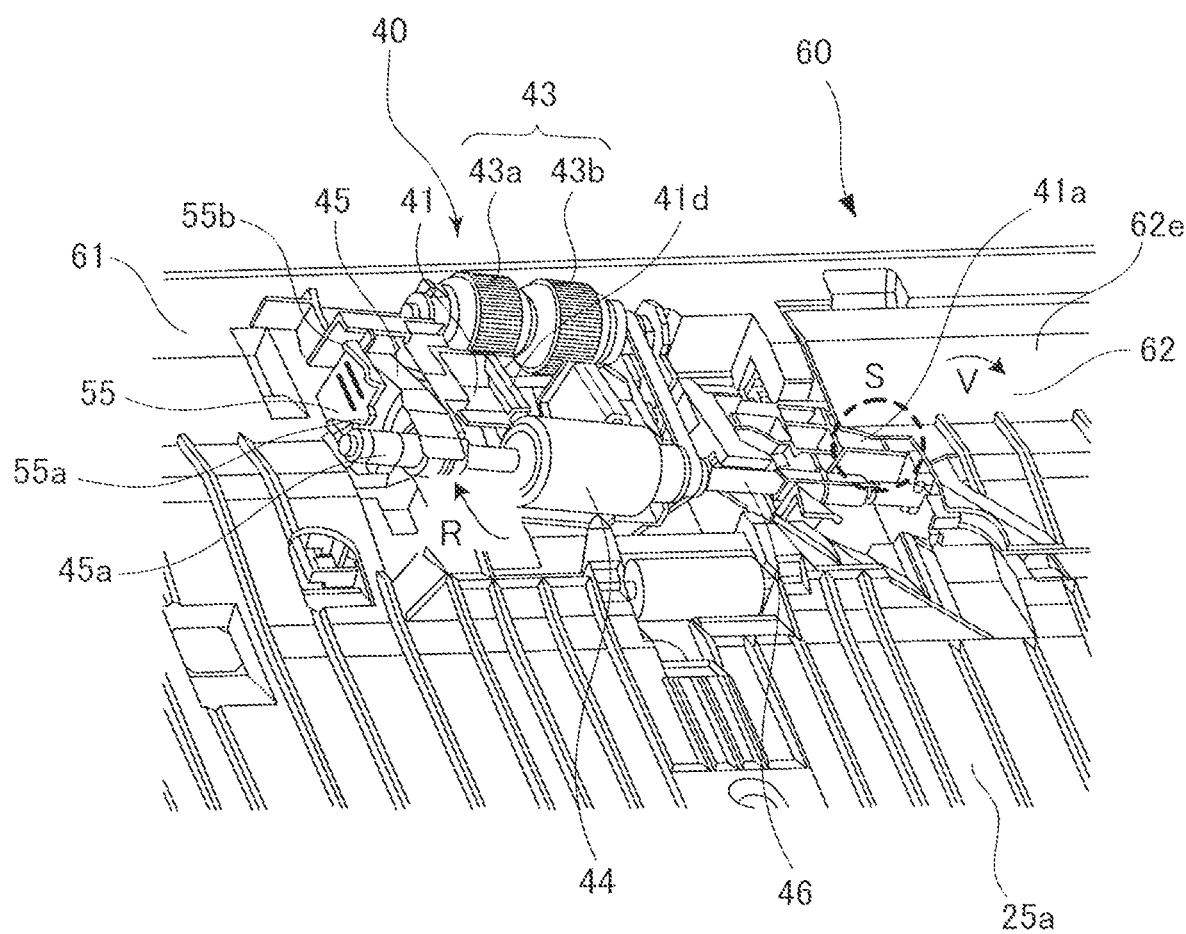
FIG. 18 is a perspective view illustrating a position in which the sheet feed unit is in midway of being detached from the cover unit.

The user, including a service technician, holds the tongue rib 41d and the pressing portion 55b to deform the separation arm 55 in the direction of arrow L. Thereby, as illustrated in FIG. 18, the engagement of the projection 55a of the separation arm 55 and the separation arm retaining portion 76 (refer to FIG. 14) is released, and the sheet feed unit 40 can be detached. Further, the user can easily hold the sheet feed unit 40, for example, by holding the tongue rib 41d with the right index finger and holding the pressing portion 55b with the right thumb.

The user can detach the cover portion 45a from the shaft clamping portion 64 (refer to FIG. 14) by pulling the sheet feed unit 40 in the arrow R direction in a state where the engagement between the projection 55a and the separation arm retaining portion 76 is released. In this state, the pair of shaft nipping pieces 64a and 64b of the shaft clamping portion 64 is pressed by the cover portion 45a and deformed in a mutually separating direction, and it is restored after the cover portion 45a is detached from the shaft nipping pieces 64a and 64b.

If the user pulls up the separation arm 55 side of the sheet feed unit 40 in this state, the arm portion 41a of the swing arm 41 contacts the cover member 62 in the closed state at a contact portion S. In this state, the coupling 66 maintains contact with the feed roller shaft 46, and the sheet feed unit 40 can be inclined in the arrow R direction corresponding to a looseness between a groove portion of the coupling 66 and the spring pin 47 provided on the first end of the feed roller shaft 46. That is, in a process in which the sheet feed unit 40 is detached from the cover unit 60 in a state where the coupling 66 is connected to the feed roller shaft 46, the arm portion 41a abuts against the cover member 62. Further, in a state where the sheet feed unit 40 is moved from the state being mounted to the cover unit 60 to the detaching direction, the arm portion 41a abuts against the cover member 62 before the feed roller shaft 46 and the cover portion 45a are separated from the shaft clamping portion 64. The shaft clamping portion 64 can be configured to retain not only the feed roller shaft 46 and the cover portion 45a but also other portions of the sheet feed unit 40.

The cover member 62 is arranged to contact the arm portion 41a of the sheet feed unit 40 in the detaching direction of the sheet feed unit 40. The detaching direction of the sheet feed unit 40 is determined, for example, by the shapes of the bearing portions 65 and 77 and the shaft clamping portion 64, and in the configuration of the present embodiment, the bearing portions 65 and 77 and the shaft clamping portion 64 have arc-shaped, i.e., U-shaped, grooves, so that the direction in which the grooves are opened is the detaching direction.

The lifting cam 85 is provided on an outside of the document conveyance path 25 (refer to FIG. 3) in the width direction so as not to interfere with the document conveyance path 25. Therefore, the cam follower 41b capable of being abutted against the lifting cam 85 must also be provided on the outside of the document conveyance path 25 in the width direction, but the pickup roller 43 swingably supported by the swing arm 41 must be provided on an inner side of the document conveyance path 25 in the width direction. Therefore, the arm portion 41a of the swing arm 41 extends in the width direction so as to arrange the cam follower 41b on the outside of the document conveyance path 25.

In the configuration of the present embodiment, the cover member 62 covers at least a portion of the coupling 66 and the arm portion 41a with respect to the document conveyance path 25, and a guide surface 62e capable of guiding the document D is formed on a lower side of the cover member 62. Therefore, it becomes possible to reduce jamming caused by the document D being caught in the arm portion 41a or the coupling 66 that swing by the rotation of the lifting cam 85.

Figure 19:
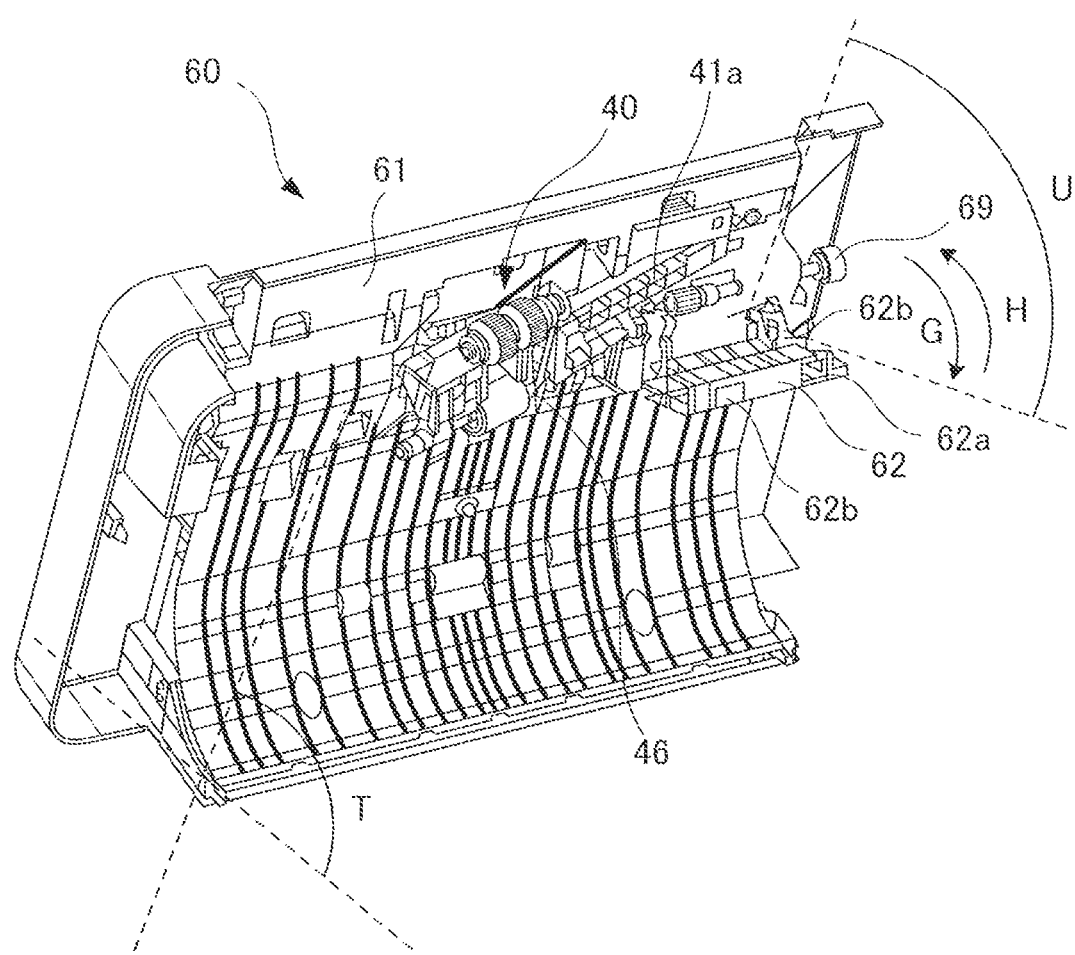
FIG. 19 is a perspective view illustrating an opening angle of the cover unit and the cover member.

The cover member 62 is pressed in a direction of arrow V by the arm portion 41a of the swing arm 41 by the sheet feed unit 40 being detached from the cover unit 60. Thereby, engagement between the cover member 62 and the retaining lever 67 (refer to FIG. 11) is released, and as illustrated in FIG. 19, the cover member 62 opens in the direction of arrow G. The connection between the coupling 66 and the feed roller shaft 46 is released by pulling the sheet feed unit 40 in the axial direction of the feed roller shaft 46 after tilting the sheet feed unit 40 in the direction of arrow R and opening the cover member 62. The releasing of connection between the feed roller shaft 46 of the sheet feed unit 40 and the coupling 66 can be performed either before or after opening the cover member 62. As described, in a state where the sheet feed unit 40 is removed, the cover member 62 is pushed by the arm portion 41a and the cover member 62 is opened, so that the sheet feed unit 40 can be removed easily.

In a state where the cover unit 60 is opened, an opening angle T of the cover unit 60 with respect to the ADF main body 103A (refer to FIG. 3) is set to approximately 80 degrees. Further, in a state where the cover member 62 is opened, an opening angle U of the cover member 62 to the cover unit 60 is set to approximately 60 degrees.

Next, a mounting operation of the sheet feed unit 40 will be described. In a state where the cover member 62 is opened, the user holds the tongue rib 41d and the pressing portion 55b of the sheet feed unit 40 and attaches the sheet feed unit 40 to the cover unit 60. In this state, the coupling 66 is slid in the axial direction against the urging force of the compression spring 75 (refer to FIG. 12), by which the feed roller shaft 46 of the sheet feed unit 40 is connected to the coupling 66.

Then, the user presses the cover portion 45a of the sheet feed unit 40 into the shaft clamping portion 64 and engages the separation arm 55 with the separation arm retaining portion 76. Thereby, the sheet feed unit 40 is retained in the cover unit 60. Lastly, the user pushes the cover member 62 in the closing direction, i.e., direction of arrow H of FIG. 19, and closes the cover member 62 with respect to the upper guide member 61.

Figure 20:
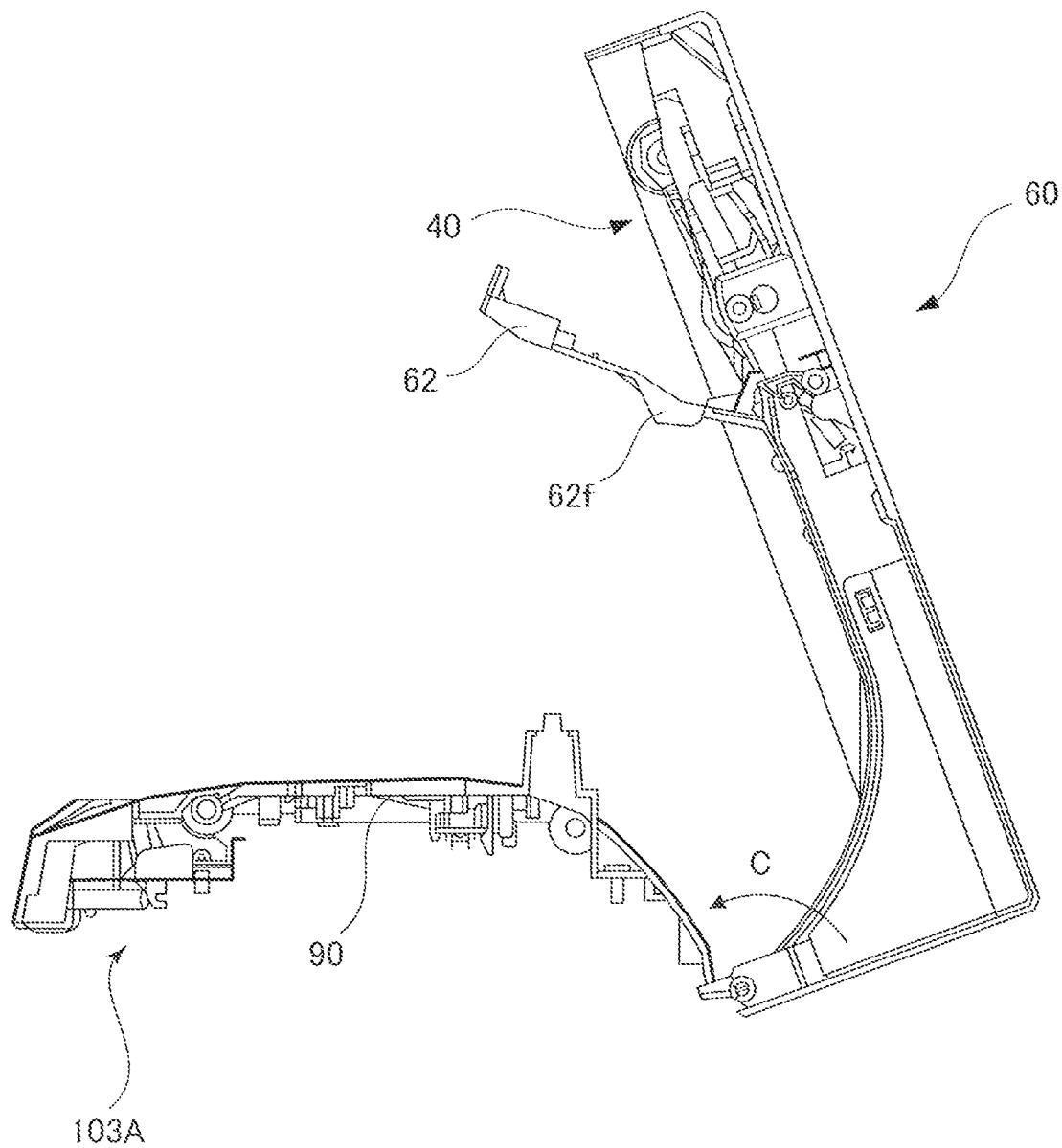
FIG. 20 is a side view illustrating a projection provided on the cover member.

If the user is required to press the cover member 62 manually to close the cover member 62, the user might forget to close the cover member 62. Further, the operation of closing the cover member 62 should be omitted for simplification. Therefore, according to the configuration of the present embodiment, as illustrated in FIG. 20, a projected portion 62f that is projected toward the ADF main body 103A is formed on the cover member 62. The projected portion 62f is arranged on the outside of the document conveyance path 25 (refer to FIG. 3) in the width direction, and it will not hinder conveyance of the document D.

Figure 21:
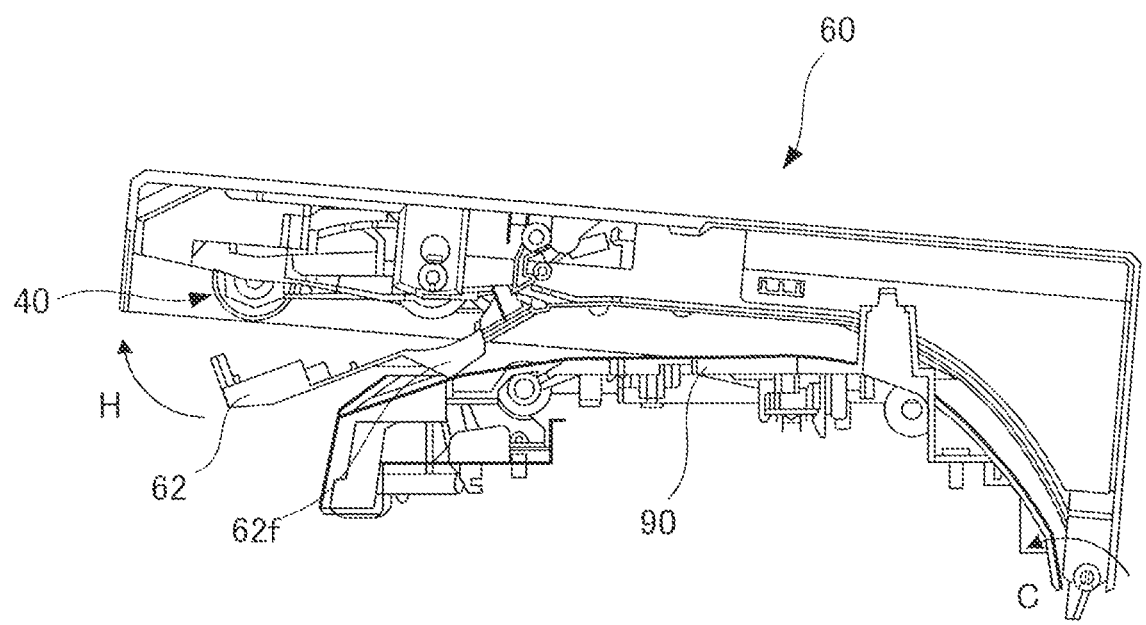
FIG. 21 is a side view illustrating a state in which the projection and a lower guide member are abutted.
Figure 22:
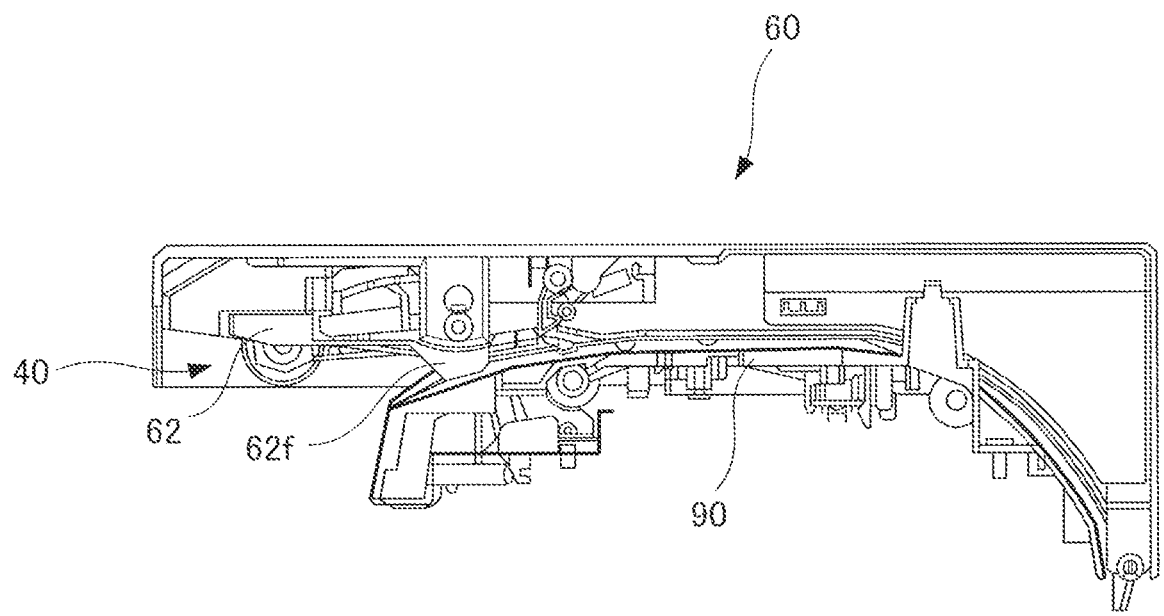
FIG. 22 is a side view illustrating a closed state of the cover member and the cover unit.

As illustrated in FIG. 21, if the cover unit 60 is closed in the arrow C direction in a state where the cover member 62 is opened, the projected portion 62f of the cover member 62 abuts against the lower guide member 90. If the cover unit 60 is further closed in the arrow C direction in this state, only the cover unit 60 will move closer to the lower guide member 90 while the cover member 62 abuts against the lower guide member 90. Then, as illustrated in FIG. 22, in a state where the cover unit 60 is closed, the cover member 62 will be retained by the retaining lever 67 (refer to FIG. 11) of the cover unit 60 and closing operation of the cover member 62 will be completed. As described, the cover member 62 will be in a closed state in linkage with the closing operation of the cover unit 60 even if the user does not close the cover member 62 manually, so that it becomes possible to omit the closing operation of the cover member 62 and prevent the cover member 62 from being left unclosed.

As described, according the configuration of the present embodiment, during detaching operation of the sheet feed unit 40, the cover member 62 is pressed by the arm portion 41a of the swing arm 41 and the cover member 62 is configured to open automatically. Thereby, in detaching the sheet feed unit 40, there is no need to open the cover member 62 manually, and the sheet feed unit 40 can be removed easily.

Furthermore, since the projected portion 62f is provided on the cover member 62, even if the cover unit 60 is closed without closing the cover member 62 after mounting the sheet feed unit 40 to the cover unit 60, the cover member 62 will close automatically. As described, attaching and detaching operation of the sheet feed unit 40 can be performed with ease, and the replacement workability of the sheet feed unit 40 can be improved.

Moreover, the cover member 62 covers a portion of the coupling 66 and the arm portion 41a, and the guide surface 62e for guiding the document D is formed on a lower side of the cover member 62. Thus, it becomes possible to reduce the probability of the document D being caught by the arm portion 41a or the coupling 66 that swing by the lifting cam 85 being rotated and causing jamming.

According to the configuration of the present embodiment, the sheet feed unit 40 included the feed roller 44, but it is also possible to omit the feed roller 44. Further, the sheet feed unit 40 can adopt a configuration where the pickup roller 43 is not supported liftably, but instead, one of the two rollers of the conveyance roller pair can simply be configured to move toward or away from the other roller.

According further to the configuration of the present embodiment, the cover member 62 is supported pivotably with respect to the upper guide member 61 around the axis extending in the width direction, but the present invention is not limited thereto. For example, the cover member 62 can be pivotably supported with respect to the upper guide member 61 around the axis extending in the direction orthogonal to the width direction, or it can be supported detachably with respect to the upper guide member 61. Any configuration can be adopted as long as the cover member 62 is opened with respect to the cover unit 60 when the sheet feed unit 40 is detached from the cover unit 60. The detachment of the cover member 62 includes opening of the cover member 62 with respect to the cover unit 60.

All the above-described configurations were illustrated based on the printer 100 adopting the electrophotographic system, but the present invention is not restricted thereto. For example, the present invention is applicable to an ink-jet image forming apparatus in which ink is discharged through nozzles to form an image on a sheet.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-129519, filed Jul. 6, 2018, which is hereby incorporated by reference herein in its entirety.

What is claimed is:

1. A sheet conveyance apparatus comprising:
a cover unit comprising a first guide;
a base unit configured to support the cover unit in an openable and closable manner, and comprising a second guide, the first guide and the second guide forming a conveyance path in a state where the cover unit is closed with respect to the base unit;
a feeding unit configured to be detachable from the cover unit, and comprising a pickup member configured to feed a sheet, a feed member configured to convey the sheet fed by the pickup member along the conveyance path, a rotation shaft configured to rotatably support the feed member, and a swing arm supported swingably around the rotation shaft and configured to support the pickup member; and
a pivotable cover supported by the cover unit so as to be pivotable between a closed position where the pivotable cover covers at least a portion of the feeding unit and an open position where the portion of the feeding unit is exposed,
wherein the pivotable cover moves from the closed position to the open position by being pressed by the feeding unit while the feeding unit is detached from the cover unit.

2. The sheet conveyance apparatus according to claim 1, wherein the cover unit comprises an engaged unit,
the feeding unit comprises an engager configured to engage with the engaged unit in a state where the feeding unit is attached to the cover unit, and
the engager is configured to move between a first position where the engager engages with the engaged unit and a second position where the engager releases engagement with the engaged unit.

3. The sheet conveyance apparatus according to claim 2, wherein the feeding unit further comprises a holding unit configured to elastically deform the engager from the first position to the second position in a state where the holding unit is being held.

4. The sheet conveyance apparatus according to claim 1, wherein the pivotable cover is supported pivotably with respect to the cover unit.

5. The sheet conveyance apparatus according to claim 1, further comprising a coupling unit rotatably supported on the cover unit and configured to be connected to and separated from the rotation shaft,
wherein the pivotable cover is configured to cover the coupling unit against the conveyance path in the closed position.

6. The sheet conveyance apparatus according to claim 5, wherein the swing arm abuts against the pivotable cover during a process in which the feeding unit is detached from the cover unit in the state where the coupling unit is connected to the rotation shaft.

7. The sheet conveyance apparatus according to claim 1, wherein the pivotable cover comprises a guide surface configured to constitute a portion of the conveyance path and guide the sheet in a case where the pivotable cover is positioned in the closed position.

8. The sheet conveyance apparatus according to claim 1, wherein the cover unit comprises a retainer comprising an opening whose downstream side is opened in a detaching direction in which the feeding unit is detached from the cover unit, the retainer being configured to retain the feeding unit attached to the cover unit, and
the pivotable cover is arranged downstream of the rotation shaft in the detaching direction.

9. The sheet conveyance apparatus according to claim 1, wherein the pivotable cover comprises a projector configured to project toward the base unit, and
in a case where the cover unit is closed with respect to the base unit, the pivotable cover is closed by the projector abutting against the base unit.

10. An image reading apparatus comprising:
the sheet conveyance apparatus according to claim 1; and
a reading unit configured to read an image on a sheet conveyed by the sheet conveyance apparatus.

11. An image forming apparatus comprising:
the image reading apparatus according to claim 10; and
an image forming unit configured to form an image on a sheet.

* * * * *